US012601471B1

(12) United States Patent
Aquilina et al.

(10) Patent No.: US 12,601,471 B1
(45) Date of Patent: Apr. 14, 2026

(54) ILLUMINABLE BADGE ASSEMBLY OF MOTOR VEHICLE

(71) Applicant: Ford Global Technologies, LLC, Dearborn, MI (US)

(72) Inventors: Anthony Nicholas Aquilina, Royal Oak, MI (US); Segundo Baldovino, Novi, MI (US); Rashaun Phinisee, Ypsilanti Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/078,359

(22) Filed: Mar. 13, 2025

(51) Int. Cl.
| | |
|---|---|
| *F21V 23/04* | (2006.01) |
| *B60Q 1/00* | (2006.01) |
| *B60R 13/00* | (2006.01) |
| *F21W 103/55* | (2018.01) |

(52) U.S. Cl.
CPC ........ *F21V 23/0464* (2013.01); *B60Q 1/0023* (2013.01); *B60R 13/005* (2013.01); *F21W 2103/55* (2018.01)

(58) Field of Classification Search
CPC . B60R 13/005; F21S 41/663; F21W 2103/55; F21V 23/0464; B60Q 1/0023
See application file for complete search history.

(56) References Cited

U.S. PATENT DOCUMENTS

| | | | |
|---|---|---|---|
| 4,600,913 | A | 7/1986 | Caine |
| 5,486,989 | A | 1/1996 | Compton |
| 6,957,132 | B1 | 10/2005 | Richburg et al. |
| 8,944,637 | B2 | 2/2015 | Spiro |
| 10,137,825 | B1 | 11/2018 | Salter et al. |
| 10,271,399 | B1 | 4/2019 | Ekladyous et al. |
| 2014/0022760 | A1 | 1/2014 | Hartwig |
| 2014/0184068 | A1 | 7/2014 | Kwon |
| 2015/0239390 | A1* | 8/2015 | Oliverio ............... B60R 13/005 340/461 |
| 2017/0253194 | A1* | 9/2017 | Salter ................... B60Q 1/2661 |
| 2018/0229649 | A1 | 8/2018 | Salter et al. |
| 2019/0097094 | A1 | 3/2019 | Han et al. |
| 2019/0337446 | A1 | 11/2019 | Salter et al. |
| 2025/0018879 | A1* | 1/2025 | Kuramitsu ............... H01Q 1/42 |

FOREIGN PATENT DOCUMENTS

| | | | | |
|---|---|---|---|---|
| CN | 201983152 | U | 9/2011 | |
| EP | 1512575 | A2 | 3/2005 | |
| JP | 2012038712 | A | 2/2012 | |
| KR | 20140026033 | A * | 3/2014 | ........... B60R 13/005 |
| WO | 2020179577 | A1 | 9/2020 | |

* cited by examiner

*Primary Examiner* — Erin Kryukova
(74) *Attorney, Agent, or Firm* — Vichit Chea; Carlson, Gaskey & Olds, P.C.

(57) ABSTRACT

A motor vehicle may include, among other things, a badge assembly including a lens and a light source selectively activatable to direct light through the lens. The motor vehicle may further include a sensor configured to generate a signal indicative of a level of ambient light, and a controller configured to issue a command to activate the light source when the level of ambient light is less than an activation threshold. The controller may further be configured to issue a command to deactivate the light source when the level of ambient light meets or exceeds the activation threshold. The light source may also be controlled based on an activation status of a lamp assembly of the vehicle. A method is also disclosed.

11 Claims, 3 Drawing Sheets

ILLUMINABLE BADGE ASSEMBLY OF MOTOR VEHICLE

TECHNICAL FIELD

This disclosure relates to an illuminable badge assembly of a motor vehicle, and corresponding systems and methods.

BACKGROUND

Motor vehicles are known to include exterior lighting systems including a number of lighting and signaling devices. Motor vehicles are also known to include vehicle badges, which may include a logo, emblem, or insignia that signifies its brand, model, or trim level, etc.

SUMMARY

A motor vehicle according to an exemplary aspect of the present disclosure includes, among other things, a badge assembly including a lens and a light source selectively activatable to direct light through the lens. The reflective material is arranged adjacent the lens. The motor vehicle further includes a sensor configured to generate a signal indicative of a level of ambient light, and a controller configured to issue a command to activate the light source when the level of ambient light is less than an activation threshold. The controller is further configured to issue a command to deactivate the light source when the level of ambient light meets or exceeds the activation threshold.

In a further non-limiting embodiment, the motor vehicle includes a lamp assembly, and, when the level of ambient light is less than the activation threshold, the controller issues a command to activate the light source such that the light source emits light at a brightness level based on whether the lamp assembly is activated.

In a further non-limiting embodiment, when the lamp assembly is functioning as a daytime running lamp and the level of ambient light is less than the activation threshold, the controller is configured to command the light source to emit light at a first brightness level, and, when the lamp assembly is not functioning as a daytime running lamp and the level of ambient light is less than the activation threshold, the controller is configured to command the light source to emit light at a second brightness level greater than the first brightness level.

In a further non-limiting embodiment, the first brightness level is 1250 nits and the second brightness level is 3,000 nits.

In a further non-limiting embodiment, when the level of ambient light is less than the activation threshold, the controller is configured to command the light source to emit light at a brightness level dependent on the level of ambient light.

In a further non-limiting embodiment, when the level of ambient light is less than the activation threshold and meets or exceeds a first sub-threshold, the controller is configured to command the light source to emit light at a first brightness level, and when the level of ambient light is less than the activation threshold, less than the first sub-threshold, and meets or exceeds a second sub-threshold, the controller is configured to command the light source to emit light at a second brightness level greater than the first brightness level.

In a further non-limiting embodiment, when the level of ambient light is less than the activation threshold and is less than the second sub-threshold, the controller is configured to command the light source to emit light at a third brightness level greater than the second brightness level.

In a further non-limiting embodiment, the activation threshold is 10,000 Lux, the first sub-threshold is 1,000 Lux, and the second sub-threshold is 400 Lux.

In a further non-limiting embodiment, the motor vehicle includes a lamp assembly configured to function as a daytime running lamp, and, when the level of ambient light is less than the activation threshold, the controller only issues commands based on the first and second sub-thresholds when the lamp assembly is not functioning as a daytime running lamp.

In a further non-limiting embodiment, the reflective material is laminated together with another material providing the lens.

In a further non-limiting embodiment, the badge assembly is shaped to correspond to one of logo, emblem, or insignia signifying a brand of the motor vehicle.

In a further non-limiting embodiment, the activation threshold is 10,000 Lux.

In a further non-limiting embodiment, the light source is one of a plurality of light sources of the badge assembly.

In a further non-limiting embodiment, each of the light sources is a light emitting diode (LED).

In a further non-limiting embodiment, the lens includes a plurality of lens portions.

A motor vehicle according to another exemplary aspect of the present disclosure includes, among other things, a badge assembly including a selectively activatable light source, a sensor configured to generate a signal indicative of a level of ambient light, a lamp assembly, and a controller. When the level of ambient light is less than an activation threshold, the controller is configured to issue a command to activate the light source such that the light source emits light at a brightness level based on whether the lamp assembly is activated.

In a further non-limiting embodiment, when the lamp assembly is functioning as a daytime running lamp and the level of ambient light is less than the activation threshold, the controller is configured to command the light source to emit light at a first brightness level, and, when the lamp assembly is not functioning as a daytime running lamp and the level of ambient light is less than the activation threshold, the controller is configured to command the light source to emit light at a second brightness level greater than the first brightness level.

A method according to an exemplary aspect of the present disclosure includes, among other things, activating a light source of a badge assembly of a motor vehicle when a level of ambient light is less than an activation threshold, and deactivating the light source when the level of ambient light meets or exceeds the activation threshold, wherein the badge assembly includes lens and a reflective material adjacent the lens.

In a further non-limiting embodiment, the method further includes, when a lamp assembly of the vehicle is functioning as a daytime running lamp and the level of ambient light is less than the activation threshold, emitting light from the light source at a first brightness level, and, when the lamp assembly is not functioning as a daytime running lamp and the level of ambient light is less than the activation threshold, emitting light from the light source at a second brightness level greater than the first brightness level.

In a further non-limiting embodiment, the method further includes, when the level of ambient light is less than the activation threshold and meets or exceeds a first sub-threshold, emitting light from the light source at a first brightness level, when the level of ambient light is less than the activation threshold, less than the first sub-threshold, and meets or exceeds a second sub-threshold, emitting light from the light source at a second brightness level greater than the first brightness level, and, when the level of ambient light is less than the activation threshold and is less than the second sub-threshold, emitting light at a third brightness level greater than the third brightness level.

DETAILED DESCRIPTION

This disclosure relates to an illuminable badge assembly of a motor vehicle, and corresponding systems and methods. Among other benefits, which will be appreciated from the below description, this disclosure optimizes light output, which increases the aesthetic appeal of the badge assembly (and in turn the vehicle), and results in power savings, reduction in heat generated during operation, and a reduction in the number of component parts (e.g., light sources) in the badge assembly.

Figure 1:
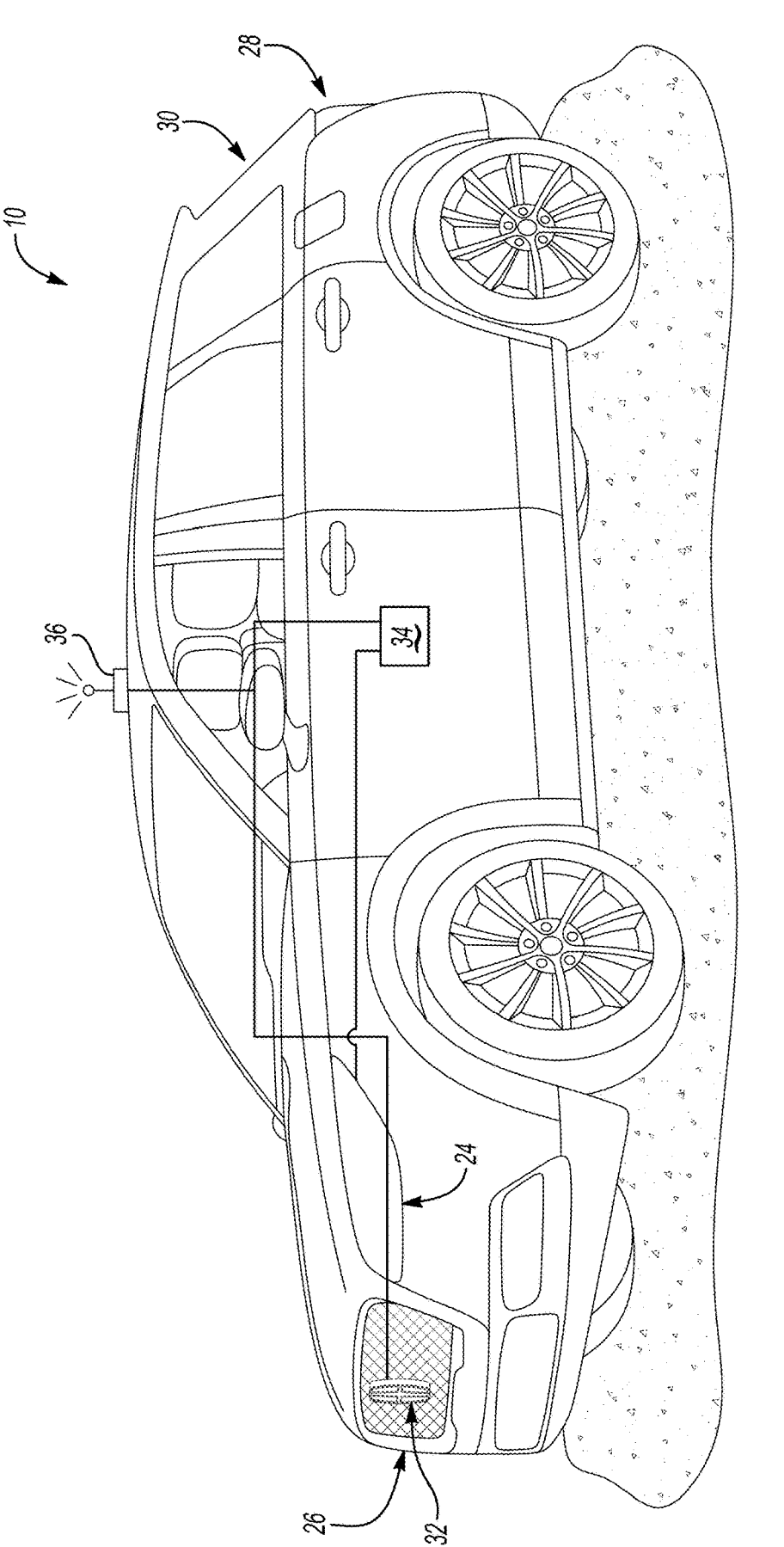
FIG. 1 is a front-perspective view of a motor vehicle with an example badge assembly.

FIG. 1 illustrates a motor vehicle 10 ("vehicle 10"). As shown, the vehicle 10 is a sport utility vehicle (SUV). While an SUV is shown, this disclosure extends to other vehicle types, including sedans, trucks, vans, etc.

The vehicle 10 could be an electrified vehicle, such as a battery electric vehicle (BEV) or a plug-in hybrid electric vehicle (PHEV). However, this disclosure is not limited to electrified vehicles.

The vehicle 10 further includes a plurality of lamps, including lamp assemblies configured to function as headlamps, turn signals, etc. In this example, the vehicle 10 includes at least four lamp assemblies 24, 26, 28, 30. Lamp assembly 24 is a front, driver-side (in geographic regions such as North America) lamp assembly configured to operate as a headlamp, turn signal, daytime running lamp, high beam, and a four-way flasher, among other possibilities. The lamp assembly 26 is configured structurally and functionally similar to the lamp assembly 24, with the exception that the lamp assembly 26 is reflected about the centerline of the vehicle 10. The lamp assembly 26 provides a front, passenger-side lamp assembly. Lamp assembly 28 is a rear, driver-side lamp assembly configured to operate as a tail lamp, turn signal, and a four-way flasher, among other possibilities. The lamp assembly 30 is configured structurally and functionally similar to the lamp assembly 28, with the exception that the lamp assembly 30 is reflected about the centerline of the vehicle 10 to provide a rear, passenger-side lamp assembly.

The vehicle 10 further includes another light assembly, which here is an illuminable badge assembly 32 ("assembly 32"). The assembly 32 is an exterior light assembly configured to selectively emit light visible from an exterior of the vehicle 10. The assembly 32 further provides a badge of the vehicle 10, in that the assembly 32 is shaped to correspond and resemble a logo, emblem, or insignia that signifies a brand, model, or trim level, etc., of the vehicle 10.

The assembly 32 is mounted to a front of the vehicle 10 and faces a forward direction such that the assembly 32 is configured to emit light generally in a forward direction. The assembly 32 is mounted on the centerline of the vehicle 10, in an example. In a particular example, the assembly 32 is bisected by the centerline of the vehicle 10 and is symmetrical about the centerline. The assembly 32 is mounted to the grille of the vehicle 10, in this example.

In this example, the assembly 32 is in communication with a controller 34. While drawn schematically as a separate structure spaced-apart from the assembly 32, the controller 34 may be part of the assembly 32. The controller 34 is in communication with a sensor 36, and the lamp assemblies 24, 26, 28, 30, among other possible structures. The assembly 32 may be considered to be part of a greater assembly, or sub-assembly of the vehicle 10, that includes the assembly 32, the controller 34, and the sensor 36, among other structures.

In this example, the assembly 32 includes a plurality of selectively illuminable sections responsive to commands from the controller 34. In aspects of this disclosure, the controller 34 receives information, such as from sensor 36 and/or from the lamp assemblies 24, 26, 28, 30, and issues commands to the assembly 32 based on that information.

The controller 34 could be part of an overall vehicle control module, such as a vehicle system controller (VSC), or could alternatively be a stand-alone controller separate from the VSC. Further, the controller 34 may be programmed with executable instructions for interfacing with and operating the various components of the vehicle 10. The controller 34 additionally includes a processing unit and non-transitory memory for executing the various control strategies and modes of the vehicle 10 and assembly 32.

While only one sensor 36 is shown in FIG. 1, the vehicle 10 could include a plurality of sensors. The sensor 36, and any other sensors, could be pre-existing sensors of the vehicle 10. As examples, the sensor 36 could be a transceiver, receiver, camera (including either still or video cameras), a radar (radio detection and ranging) sensor, a Lidar (light detection and ranging) sensor, a photodiode of the vehicle 10, a rain sensor of the vehicle 10, etc.

The sensor 36 is configured to generate signals indicative of a level of ambient light. In this disclosure, ambient light refers to light from natural sources, such as sunlight, and artificial sources, such as building lights or street lights, present in the environment adjacent the exterior of the vehicle 10.

The controller 34 is able to use the signals from the sensor 36 and/or other information, such as an activation status of daytime running lamps of the vehicle 10, to issue one or more commands to the assembly 32.

Figures 2, 3, 4:
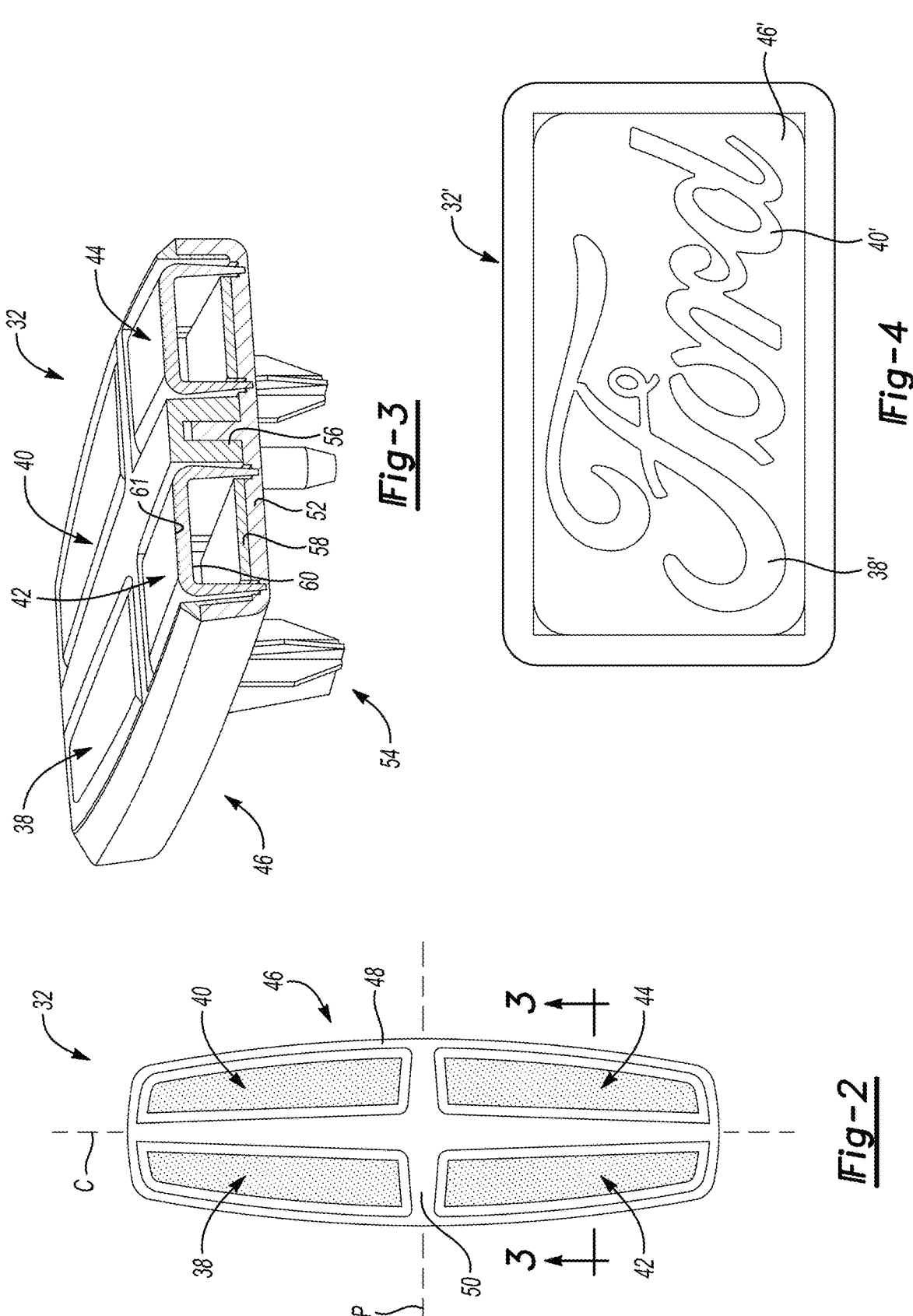
FIG. 2 is a front view of the example badge assembly.
FIG. 3 is a cross-sectional view taken along line 3-3 from FIG. 2, and illustrates additional detail of the example badge assembly.
FIG. 4 is a front view of another example badge assembly.

FIG. 2 is a front view of the assembly 32. FIG. 3 illustrates the assembly 32 in cross-section. In this example, the assembly 32 includes four illuminable sections 38, 40, 42, 44. While four sections are shown this disclosure could extend to light assemblies with a different number of sections.

In this example, the sections 38, 40, 42, 44 are configured to selectively illuminate in response to commands from the controller 34. Further, the sections 38, 40, 42, 44 are configured to selectively illuminate at one or more brightness levels in response to commands from the controller 34. In this disclosure, the sections 38, 40, 42 are configured to illuminate in concert with one another, namely at substantially the same time, for substantially the same duration, at substantially the same color, and at substantially the same brightness level.

The assembly 32 includes a housing 46 including an outer perimeter portion 48 surrounding an outside of the sections 38, 40, 42, 44. The housing 46 further a cross-shaped portion 50 inward of the outer perimeter portion 48 and separating the sections 38, 40, 42, 44.

Together, the sections 38, 40, 42, 44 and the housing 46 resemble the Lincoln logo, which is an iconic logo associated with the Lincoln Motor Company, which is a division of Ford Motor Company. This disclosure is not limited to light assemblies that resemble the Lincoln logo or any other specific logo. For example, FIG. 4 illustrates another example assembly 32' including a housing 46' surrounding illuminable sections 38', 40'. In the example of FIG. 4, the sections 38', 40' together resemble the lettering of the Ford logo, an iconic logo associated with the Ford Motor Company. In both examples, the assemblies 32, 32' provide an illuminable badge of the vehicle 10, and specifically establish a logo, emblem, or insignia that signifies a brand, model, or trim level of the vehicle 10. The vehicle 10 does not require another logo on the front of the vehicle 10 in addition to the assemblies 32, 32'.

With reference back to FIG. 3, the housing 46 includes a base 52 having a plurality of connectors 54 projecting therefrom in a direction opposite the sections 38, 40, 42, 44. The connectors 54 facilitate connection of the housing 46, and in turn the assembly 32, to the vehicle 10. The connectors 54 may mechanically and electrically connect the assembly 32 to the remainder of the vehicle 10.

The housing 46 is made of an opaque material in one example. Further, the housing 46 may be a two-piece housing. As shown, the housing 46 includes a cover 56 connected to the base 52, such as by a snap-fit, adhesive, or welded connection. While the sections 38, 40, 42, 44 are illuminable and the housing 46 is not, in other examples the housing 46 is illuminable in addition to or as an alternative to the sections 38, 40, 42, 44.

Each section 38, 40, 42, 44 includes its own lens and light source in this example. Specifically, with reference to section 42, a light source 58 is mounted to the base 52. The light source 58 is covered by a lens 60. The lens 60 projects upward from the base 52 and substantially fills the space between the outer perimeter portion 48 and the cross-shaped portion 50 of the housing 46 that is associated with the section 42. While only one light source is shown within the section 42, each section could include additional light sources. The arrangement of the section 42 is representative of the arrangement of the remaining sections 38, 40, 44.

The lens 60 is configured to direct light emitted from the light source 58 outward such that the light is visible from an exterior of the vehicle 10. Further, the lens 60 is attached to the housing 46 in a manner that seals the light source 58 from the environment. The lens 60 may be made entirely or partially of transparent material to provide a desired lighting pattern.

In this example, the lens 60 includes a reflective material 61, such as a reflective paint or a reflective coating, arranged relative to at least one additional layer of material, such as a clear or a colored material. The reflective material 61 is configured to reflect ambient light to draw a gaze of an onlooker to the assembly 32 by illuminating section 42. The reflective material 61 may be laminated together with another material providing the lens 60. Each section 38, 40, 42, 44 may include a similarly-configured lens.

The light source 58 in this embodiment is an optical, film-based, light emitting diode (LED), which is substantially planar and fills substantially the entirety of the section 42. The film-based LED is supported by the base 52. The film-based LED is selectively illuminable in response to commands from the controller 34. The film-based LED is capable of illuminating in a plurality of different colors, in a plurality of different sequences, and at variable intensities, as commanded by the controller 34.

Alternatively, the light source 58 could be provided as a printed circuit board (PCB) LED. In that example, the light source 58 could include one or more strips of LEDs, which are mounted to a PCB, which in turn is mounted to base 52. The PCB may be in communication with each of the LEDs within the strips of LEDs, and may also be in communication with, or considered part of, the controller 34. Each strip of LEDs may include a plurality of spaced-apart LEDs along its length. In addition, the light source 58 could be provided by organic light-emitting diodes (OLEDs) or by a laser light source.

Figure 5:
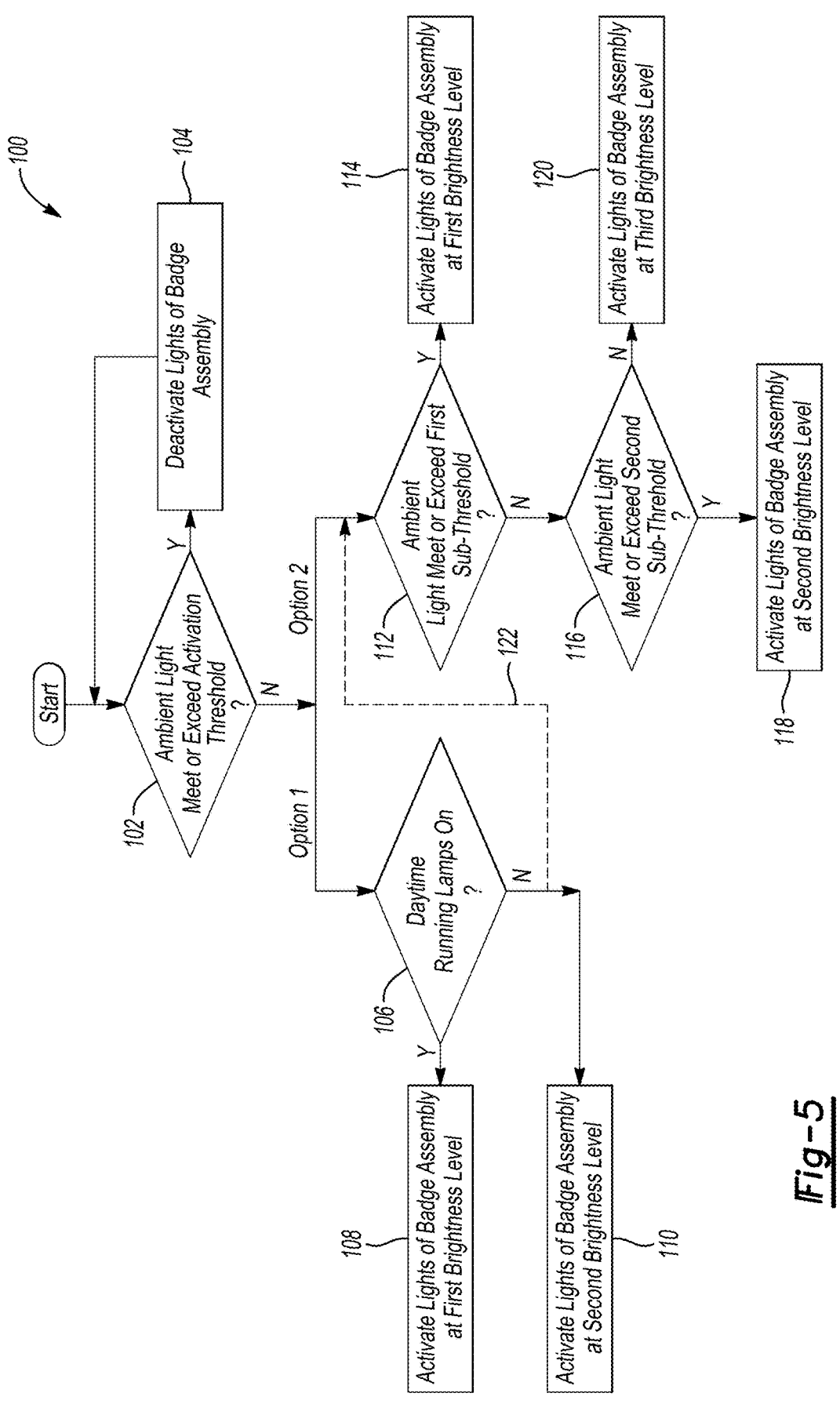
FIG. 5 is a flow chart representative of an example method.

Example control strategies for illuminating the assembly 32 will now be described with reference to the flow chart of FIG. 5, which represents an example method 100. Method 100 applies equally to assembly 32' and other similar assemblies.

The control strategies of method 100 are executed by the assembly 32, in response to commands from the controller 34, which responds to various inputs and/or information, as described herein.

In the method 100, the controller 34, at 102, considers whether the level of ambient light adjacent vehicle 10, based on the signals from the sensor 36, meets or exceeds an activation threshold. The activation threshold is 10,000 Lux in one example. If so, then at 104 the controller 34 is configured to issue a command to deactivate the light source(s) of the assembly 32. If not, the controller 34 is configured to issue one or more commands to activate the light source(s) of the assembly 32. In this disclosure, the controller 34 follows one of two options, which may interrelate as discussed below, when issuing commands to the light sources of the assembly 32.

In option 1, the controller 34 is configured to issue a command to activate the light source(s) of the assembly 32 such that the light source(s) emit light at a brightness level based on whether the daytime running lamps of the vehicle 10 are activated. Specifically, at 106, the controller 34 considers whether one or more of the lamp assemblies 24, 26, 28, 30 is functioning as a daytime running lamps. If so, the controller 34 issues a command such that the light source(s) of the assembly 32 emit light at a first brightness level, at 108. If not, then at 110, the controller is configured to command the light source(s) of the assembly 32 to emit light at a second brightness level greater than the first brightness level. In one specific example, the first brightness level is 1250 nits and the second brightness level is 3,000 nits. In this way, there is a greater brightness emitted by the assembly 32 in relatively low ambient light conditions and when the vehicle 10 is not otherwise emitting light via the daytime running lamps. Further, when the daytime running lamps are deactivated, there may be more power available to illuminate the assembly 32 at a greater brightness.

In option 2, the controller 34 is configured to command the light sources of the assembly 32 to emit light at a brightness level dependent on the level of ambient light detected by sensor 36. In one specific example, at 112, the controller 34 considers whether the level of ambient light meets or exceeds a first sub-threshold. If so, at 114, the controller 34 is configured to command the light source(s) of the assembly 32 to emit light at a first brightness level. If not, at 116, the controller 34 is configured to consider whether the level of ambient light meets or exceeds a second sub-threshold. If so, at 118, the controller is configured to command the light source(s) of the assembly 32 to emit light at a second brightness level greater than the first brightness level, and if not, the controller 34 is configured to command the light source(s) of the assembly 32 to emit light at a third brightness level greater than the second brightness level, at 120. In an example, the first sub-threshold is 1,000 Lux, and the second sub-threshold is 400 Lux. The first brightness level referenced in step 108 is not necessarily the same as the first brightness level referenced in step 114, and likewise the second brightness level referenced in step 110 is not necessarily the same as the second brightness level referenced in step 118. A user may select whether the controller 34 should follow option 1 or option 2.

Further, options 1 and 2 may be interrelated in on example. In that example, option 2 is only followed when the daytime running lamps are not activated, as represented by dashed line 122. When the daytime running lamps are off, such conditions correspond to relatively dark or nighttime conditions, and as such the assembly 32 may benefit from following the scheme of option 2. Otherwise, if the daytime running lamps are activated, the method essentially is directed to box 108, and the assembly 32 is illuminated at the first brightness level.

It should be understood that terms such as "about," "substantially," and "generally" are not intended to be boundaryless terms, and should be interpreted consistent with the way one skilled in the art would interpret those terms. Further, directional terms such as "forward," "rearward," "upward," "downward," "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
   a badge assembly including a lens and a light source selectively activatable to direct light through the lens, wherein reflective material is arranged adjacent the lens;
   a sensor configured to generate a signal indicative of a level of ambient light;
   a controller configured to issue a command to activate the light source when the level of ambient light is less than an activation threshold, and to issue a command to deactivate the light source when the level of ambient light meets or exceeds the activation threshold; and
   a lamp assembly configured to function as a daytime running lamp,
   wherein, when the level of ambient light is less than the activation threshold and meets or exceeds a first sub-threshold, the controller is configured to command the light source to emit light at a first brightness level, wherein, when the level of ambient light is less than the activation threshold less than the first sub-threshold, and meets or exceeds a second sub-threshold the controller is configured to command the light source to emit light at a second brightness level greater than the first brightness level,
   wherein, when the level of ambient light is less than the activation threshold and is less than the second sub-threshold the controller is configured to command the light source to emit light at a third brightness level greater than the second brightness level, and
   wherein, when the level of ambient light is less than the activation threshold, the controller only issues commands based on the first and second sub-thresholds when the lamp assembly is not functioning as a daytime running lamp.

2. The motor vehicle as recited in claim 1, wherein:
   the activation threshold is 10,000 Lux,
   the first sub-threshold is 1,000 Lux, and
   the second sub-threshold is 400 Lux.

3. The motor vehicle as recited in claim 1, wherein the reflective material is laminated together with another material providing the lens.

4. The motor vehicle as recited in claim 1, wherein the badge assembly is shaped to correspond to one of logo, emblem, or insignia signifying a brand of the motor vehicle.

5. The motor vehicle as recited in claim 1, wherein the activation threshold is 10,000 Lux.

6. The motor vehicle as recited in claim 1, wherein the light source is one of a plurality of light sources of the badge assembly.

7. The motor vehicle as recited in claim 6, wherein each of the light sources is a light emitting diode (LED).

8. The motor vehicle as recited in claim 1, wherein the lens includes a plurality of lens portions.

9. A motor vehicle, comprising:
   a badge assembly including a selectively activatable light source;
   a sensor configured to generate a signal indicative of a level of ambient light;
   a lamp assembly; and
   a controller, wherein, when the level of ambient light is less than an activation threshold, the controller is configured to issue a command to activate the light source such that the light source emits light at a brightness level based on whether the lamp assembly is activated.

10. The motor vehicle as recited in claim 9, wherein:
   when the lamp assembly is functioning as a daytime running lamp and the level of ambient light is less than the activation threshold, the controller is configured to command the light source to emit light at a first brightness level, and
   when the lamp assembly is not functioning as a daytime running lamp and the level of ambient light is less than the activation threshold, the controller is configured to command the light source to emit light at a second brightness level greater than the first brightness level.

11. A method, comprising:
   activating a light source of a badge assembly of a motor vehicle when a level of ambient light is less than an activation threshold;
   deactivating the light source when the level of ambient light meets or exceeds the activation threshold, wherein the badge assembly includes lens and a reflective material adjacent the lens;

when a lamp assembly of the vehicle is functioning as a
daytime running lamp and the level of ambient light is
less than the activation threshold, emitting light from
the light source at a first brightness level; and when the lamp assembly is not functioning as a daytime
running lamp and the level of ambient light is less than
the activation threshold, emitting light from the light
source at a second brightness level greater than the first
brightness level.

* * * * *